Patented Aug. 24, 1943

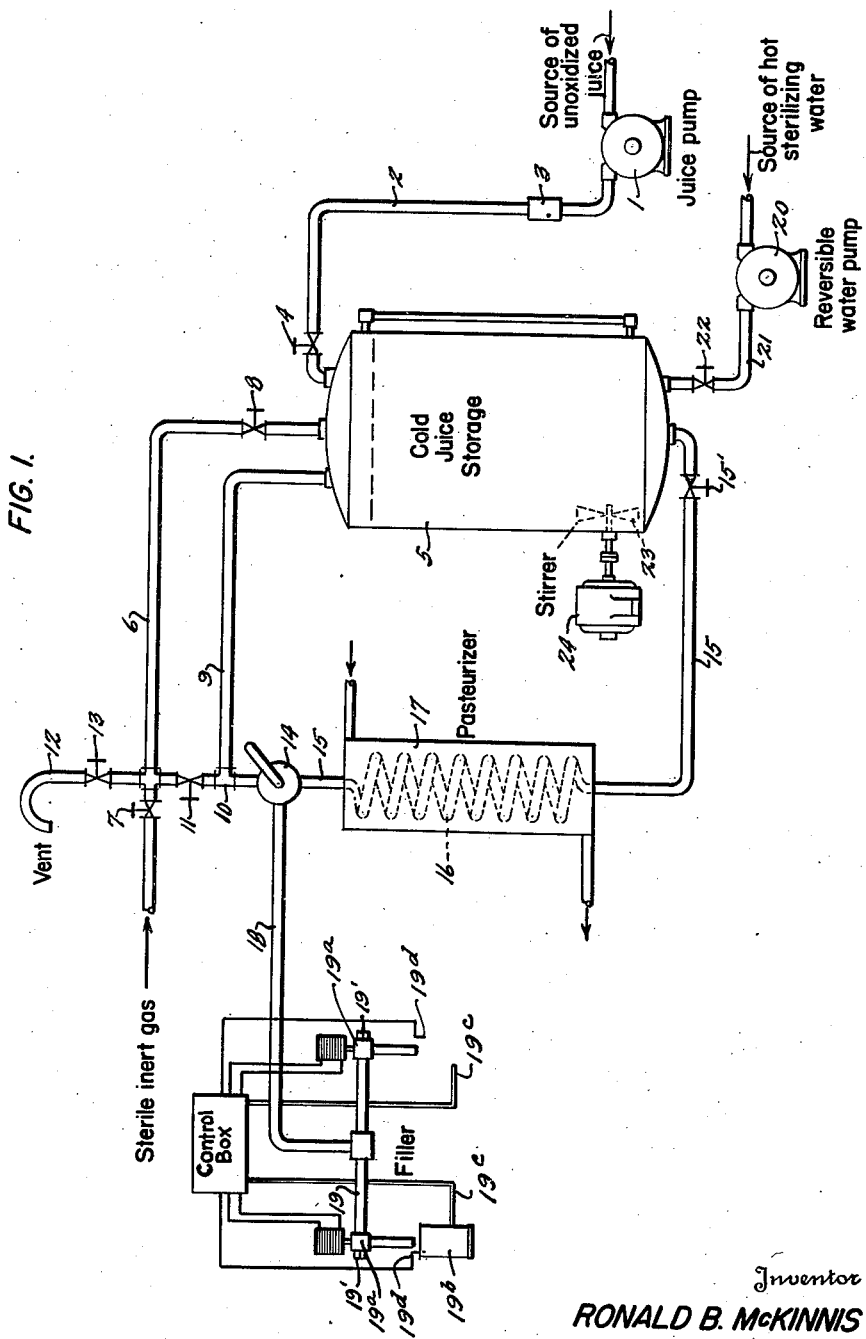

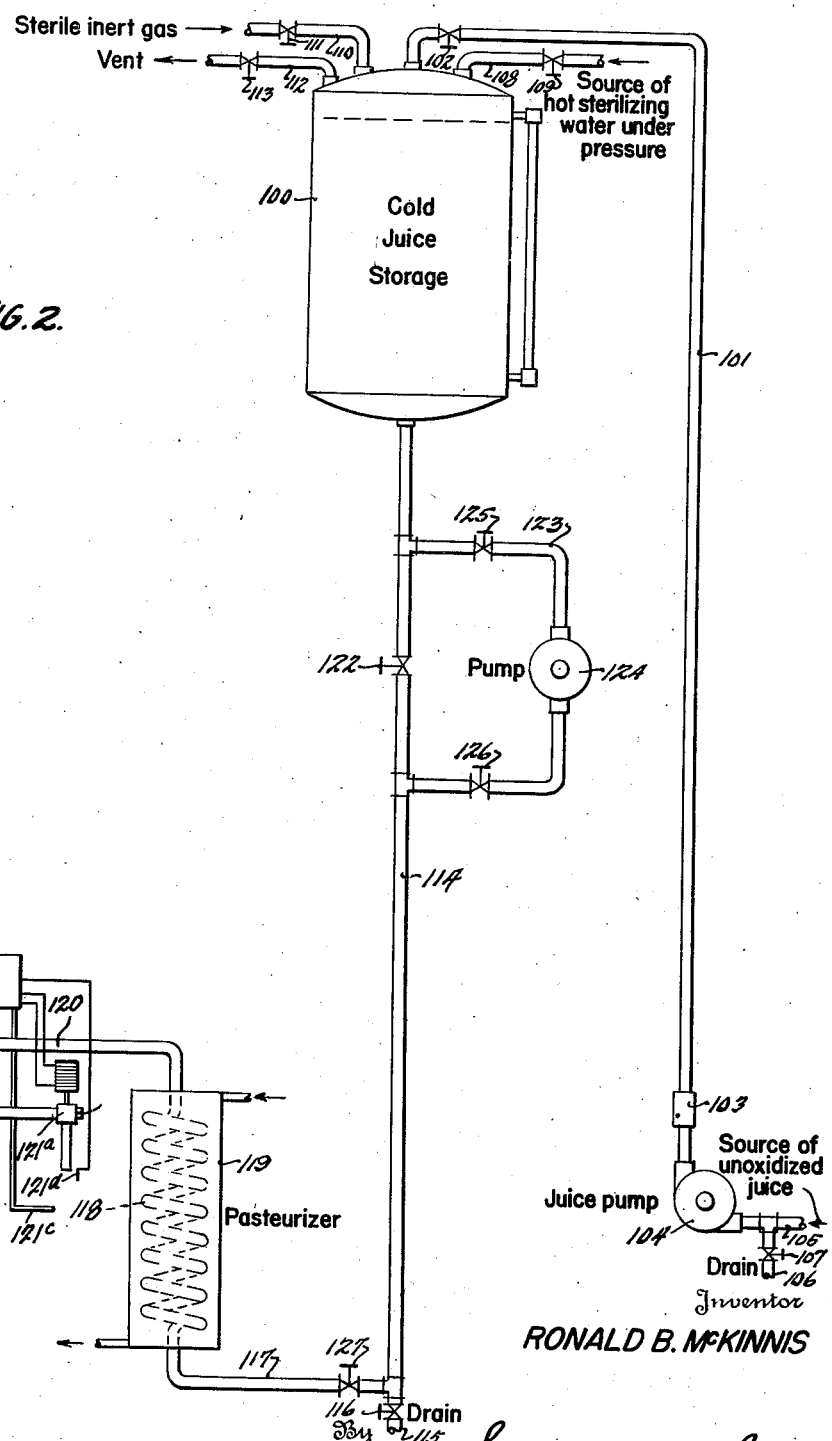

2,327,732

UNITED STATES PATENT OFFICE 2,327,732

FILLING METHOD

Ronald B. McKinnis, Winter Haven, Fla., assignor, by mesne assignments, to Ronald B. McKinnis, doing business as McKinnis Foods, Winter Haven, Fla.

Application March 12, 1941, Serial No. 383,041

7 Claims. (Cl. 99—155)

My invention relates to a process and apparatus for filling receptacles with liquids, and more particularly to a process and apparatus for filling receptacles with the juice of fruits and vegetables.

In filling the juice of fresh fruits and vegetables in receptacles for storage it is of prime importance that the juice not only during extraction but during the filling process be uncontaminated with oxygen from the air. Further, it is necessary at some stage after extraction to pasteurize the juice to prevent bacterial contamination.

I have found that juice cells and other pulpy matter separate readily from citrus juices while in a filler tank or bowl. If the juice is hot, drying will take place on the edge of the bowl at the point of contact of the top surface of the juice with the metal parts, such as the bowl. Since the level of juice rises and falls during operation of the filler this condition is aggravated and results in the imparting of a cooked flavor to the juice. The same principle applies to all other surfaces periodically in contact with juice. Exposure of the juice to oxidation is a further disadvantage.

Most filling processes employ tanks or bowls for containing the juice. Such constructions prolong the storage of the hot juice, allow separation of solid particles and impart a cooked flavor due to drying of the juice, and moreover, if an open tank, exposes the juice to oxidation by the air and evaporation of the more volatile constituents of the aroma. The cooked flavor is in part due to the exposure of parts alternately to juice and atmosphere and to the high temperature to which thin films of the juice are subjected. This dries the juice and permits a cooked flavor to be imparted to it.

In my system I fill the containers or receptacles direct from a pipe source of supply, avoiding rehandling of the juice, its oxidation or drying. The separation of the solid particles in the juice is avoided.

My system does not employ a tank on the filler itself. The juice is thus pasteurized only as fast as the filler operates and the storage of hot juice is only the small amount that is contained in the pipe between the pasteurizer and the filler and in the distributing tubes of the filler, these being completely filled with the juice. A constant regulable pressure of inert gas on the juice in the supply tank is used to force juice through the pasteurizer to the filler. The juice being under constant pressure flows only as fast as the filler uses it. The entire system is maintained completely filled with the juice and the juice is supplied to the filler at the same rate that it is discharged therefrom into the receptacles, thereby preventing cooking of the juice.

In the drawings:

Figure 1 is a diagrammatic view of one form of system which I may employ;

Figure 2 is a diagrammatic view of an alternate form of system which I employ.

Referring to the drawings, I have shown a source of unoxidized juice which is adapted to be pumped by a juice pump 1 through a juice line 2 in the direction of the arrows. Located in the juice line 2 is a check valve 3. A cut-off valve is shown at 4 adjacent the point of entry of the line 2 into the top of a cold juice storage tank 5. Leading into the top of the cold storage tank is an inert gas line 6 leading to a source of inert gas, not shown. The flow into line 6 may be controlled by a valve 7 as well as a valve 8 adjacent the storage tank 5. Leading from the top of the storage tank 5 is a vent line 9 which joins a line 10. In the line 10 is a cut-off valve 11. The line 10 is provided with a downturned end, as indicated at 12, and a cut-off valve is located at 13.

The line 10 terminates in a three-way valve 14. The three way valve 14 is located at the end of a line 15 which comprises a coil 16 which is a pasteurizing coil located within a heating jacket 17 through which is adapted to flow the heating fluid. The line 15 enters the bottom of the cold juice storage tank 5, and a valve 15' is provided adjacent the cold juice storage tank 5.

Leading to the three-way valve 14 is a line 18 which terminates in a distributing head 19 from which receptacles are adapted to be filled with the pasteurized unoxidized fruit juice.

The filler is of a type wherein the filling bowl is eliminated, the hot juice flowing directly from the pasteurizer 17 to the distributing head 19. The flow from the distributing head is controlled by valves 19a which are operated by movement of a receptacle 19b. As diagrammatically illustrated, the valves 19a are solenoid operated and are electrically energized to open the valve as the receptacle 19b moves under the valve 19a and contacts a suitable feeler 19c. Electrode means 19d may be provided to shut off the current supply to the solenoid and close the valve 19a when the receptacle has been filled. The whole filling system is maintained completely filled and the hot juice is suplied to the distributing head 19 at the same rate that it is discharged therefrom, thus preventing the cooking of films of juice left on the heated surfaces by fluctuations of the juice level.

In order ot sterilize the system and cleanse it at appropriate times I have provided a source of hot sterilizing water which is adapted to be pumped by a reversible water pump 20 through a line 21 into the bottom of the cold juice storage tank 5. The flow of the water through the line 21 is controlled by a cut-off valve 22.

In order to prevent settling of the seeds, juice cells and solid particles in the juice and juice storage tank 5, I have shown a stirrer 23 adapted to be operated by a motor 24.

At the beginning of the cycle of operation and in order to thoroughly sterilize all parts of the system, I start the reversible water pump 20 in a direction to fill the storage tank 5 by opening the valve 22. The valve 8 in the line 6 is closed and the valve 13 in the line 10 is open so that air in the system can be vented out of the vent pipe 10 ahead of the hot water entering the system. It is to be understood that the juice pump at this time is not working and that the valve 4 in the juice line 2 is closed. The valve 7 in the inert gas line 6 is likewise closed. The valve 11 in line 10 may be opened to permit air to be driven out of the pipe 9 leading into the top of the storage tank 5. The three-way valve 14 is turned to connect the lines 10, 15 and 11 to vent the line 15 and pasteurizer coil 16 and permit the sterilizing liquid to flow through the line 18 into the filler head 19. Drain plugs 19' in the filler have been removed. Hot sterilizing fluid flushes through the system and is discharged from the vent 12 and the cleaning plugs 19'.

Let us assume that sufficient sterilizing and cleansing of all the parts has now been effected, at which time the vent valve 13 is closed, gas valves 7 and 8 are opened, valve 11 remains open and the valve 14 is turned to connect lines 10 and 15 and close off line 18. The reversible water pump 20 is reversed in a direction to suck the hot water out of the system, and the system is adapted to be then filled with inert sterile gas, through the pipe 6. The valve 22 in line 21 is still open, and the reversible water pump is now in reverse, sucking water out of the cold storage tank 5. Inert sterile gas flows into tank 5, sucked in by the falling water level in that tank. Line 9 discharges its content of water into the tank 5. The water level in pipe 15 and heat exchange coil 16 which is part of the sterilizer will fall as the water level in tank 5 falls. When all the water has been drained out of the system, the water pump is stopped and the valve 22 closed. The valve 14 is turned to connect lines 10 and 18, and shut off line 15. Water now flows from the line 18 and filler head 19 and is replaced by gas from the lines 6 and 10. The drain plugs 19' are now closed. The system is now filled with inert sterile gas. Valves 7 and 8 are left open. Valve 13 has been closed to prevent escape of the inert gas. Unoxidized juice is pumped through line 2 and valve 4 to the cold juice storage tank 5, and drives out in front of it the sterile inert gas in the system which flows back into a storage tank, not shown, in order to prevent wastage of gas.

When the level of cold juice has risen to the desired point in the tank, valve 11 is closed; the desired gas pressure is built up in the tank, and valve 14 is moved to throw into communication lines 15 and 18. The stirrer 23 is started; and the system is now ready for operation.

Alternately the valve 8 may be closed and the liquid forced into the tank by the juice pump will compress the gas therein to the desired pressure for operation. The output of the pump may be regulated to maintain this operating pressure as juice is withdrawn to the filling containers.

The receptacles or cans 19b pass to the head 19 and are filled, the juice being expelled through line 15 and valve 15' into the pasteurizer where it is immediately pasteurized and passes into pipe 18, and is distributed through head 19 and valves 19a into the cans. The unoxidized juice can be pumped into the system through line 2 as desired to maintain the desired pressure in tank 5. The stirrer 23 prevents settling of the juice sacs and solid matter in the storage tank 5. It is to be understood, of course, that valve 22 when the system has once been drained of water is closed and the reversible water pump 20 has remained idle during the filling of the system with the cold unoxidized juice. Because the lines leading from the pasteurizer to the filler are filled with liquid at all times there is no danger of cooking or scorching of the liquid as large volumes of the liquid are always in contact with the heated surfaces and therefore overheating and excessive cooking are avoided. Moreover the small diameter of the pipe 16 in proportion to the amount of material passing therethrough causes rapid change of liquid in contact with the heated surfaces.

The system is readily adaptable to a rapid operation wherein oxidation is entirely avoided and a minimum of juice is maintained in the pasteurized state. Moreover the system can be quickly cleaned whenever desired. It is obvious that in the system described in connection with Figure 1, inert gas under elevated pressure may be employed, in which case the operation of the reversible water pump 20 will be assisted by the pressure of the inert gas which will aid in the evacuation from the system of the sterilizing hot water.

For certain types of fruit or vegetable juices to be canned it may be desirable to limit the amount of gas absorbed by the juice. This gas absorption would be increased by the elevated pressure in the cold juice storage tank. Figure 2 represents diagrammatically one system in which the cold juice is moved by gravity to the containers being filled and only make up gas supplied to the storage tank as the juice is withdrawn.

Referring to Figure 2, a cold juiice tank 100 is adapted to be filled through a filler line 101 having therein a cut-off valve 102 and a check valve 103. There is provided a juice pump 104 which receives juice from a feed line 105 connected to a source of unoxidized juice. The system can be drained through a drain pipe 106 controlled by a valve 107. Leading into the top of tank 100 is a hot water line 108 having therein a control valve 109. This water is adapted to be under pressure though means for creating pressure are not shown in the drawings. The cold juice storage tank 100 is provided with an inert gas line 110 connected to its top, having therein a control valve 111. In the top of the storage tank 100 is connected a vent line 112 having a control valve 113.

Leading out of the cold juice storage tank is a feed line 114 which is adapted to carry the juice. At the bottom of 114 is a branch line 115 which acts as a drain for the system controlled by a valve 116. Connected to the line 114 is a line 117 which leads to a heat exchange coil 118 adapted to lie within a fluid jacket 119 which may contain hot fluid to sterilize the juice flowing through the heat exchange coil 118. This assembly just described comprises a pasteurizer. Leading from the pasteurizer is a line 120 which in turn communicates with a distributing head 121 that is similar in construction and operation to that described in connection with Figure 1.

In the line 114 is a cut-off valve 122 which may be closed to cause the juice to flow through a branch system 123 having therein a pump 124. The branch system 123, connected on either side of the valve 122 in the line 114, has control valves 125 and 126 lying on either side of the pump 124.

The system just described permits the system to operate by gravity from the tank 100 since the level of juice in the tank 100 is sufficiently above the pasturizer and filler to give a great enough head to permit operation of the system under ordinary circumstances without any additional pressure.

Should additional pressure be described however, the pump 124 in the by-pass of system 123 can be operated to give the desired excess pressure. The line 117 is provided with a valve 127 to permit regulation of the flow of fluids in the pipe 120 which leads to the filler head 121.

The inert gas which is admitted through a line 110 is not under pressure as in the case of the system shown in Figure 1.

The operation of the system shown in Figure 2 is quite similar to that shown in Figure 1. The operation can be divided into three cycles, namely, sterilization cycle, the cycle for filling the system with inert gas, and the juice filling cycle.

In the sterilization cycle valves 102 in line 101 and valve 107 in line 106 are closed and the juice pump 104 is not in operation. However, hot water under pressure is admitted through line 108, valve 109 being opened into the juice storage tank 100, and fills the tank 100, the line 114 and the by-pass line 123. During this cycle of operation the valves 122 in line 114 and valves 125 and 126 in by-pass line 123 are open. The pump 124 will admit liquid from one side to the other of line 123. Communication between line 114 and 115 is prevented by manipulation of the valve 116. The hot sterilizing water admitted to the tank 100 drives in front of it air which may be in the system through vent line 112, the valve 113 in that line being open.

The inert gas line 110 is closed through valve 111. The hot water fills line 117, heat exchange coil 118, line 120, and the filler 121 through drain plugs 121', the valve 127 in line 117 being left slightly open to permit some water to pass out of line 120.

When the system has been thoroughly flushed with the hot sterilizing water, the valve 109 in line 108 is closed and valve 116 in drain pipe 115 is open. The valve 111 in inert gas line 110 is open and valve 127 in line 117 is closed. The water will drain out of the apparatus through drain pipe 115, and the apparatus will become filled with inert gas. Prior to completely draining the tank 100, the valve 116 is closed, valve 127 opened and the remaining water allowed to flow through the filler head plugs 121' drawing gas after it to fill the sterilizer and filler head with the sterile inert gas.

Let us assume that the system is to operate entirely by gravity pressure. In this case valves 125 and 126 in by-pass line 123 are closed; valve 122 remains open. Unoxidized juice is sent from its source through the operation of juice pipe 104 through the line 101, the valve 102 now being open, into the cold juice storage tank 100, which fills the cold juice storage tank and the line 114 with unoxidized juice. The inert gas in the system can be driven back through the inert gas line 110 to storage. It is to be understood, of course, that vent line 112 has been closed through operation of valve 113 during the filling of the system with the inert gas and also during the filling of the system with the unoxidized juice.

The system is now filled with juice and the operation of filling the receptacles 121b can be initiated by opening the valve 127. This will permit gas to be expelled from pipe 117, heat exchange coil 118, pipe 120 and the filler 121. When the gas has been expelled the juice will then start flowing out of the filler 121 and valves 121a, and the receptacles may be filled with the juice.

As in the system previously described in connection with the apparatus shown in Figure 1, it is to be realized that only the quantity of juice which is flowing immediately to the filler is heated and pasteurized; that there is a considerable flow against the hot interior surfce of the heat exchange coil 118 and there is no chance for air to oxidize the juice at this stage, or for the juice to gather in thin films on heated surfaces and become cooked.

Should additional pressure be desired over that furnished by the action of gravity on the juice in the storage tank 100, the valve 122 may be closed, the pump 124 started, valves 125 and 126 opened in the by-pass line 123, and the pump 124 will give any desired additional pressure for speeding up the flow of juice in the line 114.

Obviously the system can be drained through line 115 at any time it is desired to remove the juice remaining in the parts of the apparatus by opening the valve 116.

I desire that I be limited only by the scope of the appended claims and the showing of the prior art.

I claim:

1. A method of filling receptacles with heated liquids which are subject to oxidation and bacterial contamination comprising storing a a cold liquid under a super-atmospheric pressure of inert gas, forcing the liquid to a heating step by the pressure head of the gas, and intermittently withdrawing the liquid from the heating step into receptacles while maintaining a constant volume of liquid between the heating step and the receptacles to prevent cooking of the liquid.

2. A method of filling receptacles with heated fruit and vegetable juices comprising storing the cold juices under a super-atmospheric pressure of inert gas, forcing the juices to a pasteurizer by the pressure head of the gas, and intermittently withdrawing the juices from the pasteurizer into receptacles while maintaining a constant volume of juices between the pasteurizer and the receptacle to prevent cooking of the juice.

3. A method of filling liquids which are subject to oxidation and bacterial contamination into receptacles comprising storing the liquids, forcing the liquid to a heating step by pressure of an inert gas, and intermittently withdrawing the liquid from the heating step into receptacles while maintaining a constant volume of liquid between the heating step and the receptacle to prevent cooking of the liquid.

4. A method of filling liquids which are subject to oxidation and bacterial contamination into receptacles comprising storing the liquid, forcing the liquid to a pasteurizer by pressure of an inert gas, and intermittently withdrawing the liquid from the pasteurizer into receptacles while maintaining a constant volume of liquid between the pasteurizer and the receptacle to prevent cooking of the liquid.

5. A method of filling heated fruit and vegetable juices into receptacles comprising storing the cold juices under a super-atmospheric pressure of inert gas, forcing the juices to a pasteurizer and filling head by the pressure head of the gas, and intermittently withdrawing the juices from the filling head when a receptacle is disposed thereunder while maintaining a constant volume of juice between the pasteurizer and the filling head to prevent cooking of the juice.

6. A method of filling heated fruit and vegetable juices into receptacles comprising storing the cold juices under a super-atmospheric pressure of inert gas, forcing the juices to a pasteurizer and filling head by the pressure head of the gas, withdrawing the juices from the filling head when a receptacle is disposed thereunder while maintaining a constant volume of juices between the pasteurizer and the filling head, and arresting the flow of juice through the filling head when the desired amount of juice is in the receptacle.

7. A method of filling heated liquids which are subject to oxidation and bacterial contamination into receptacles comprising storing the cold liquid under a super-atmospheric pressure of inert gas, continually agitating the stored liquid to prevent the settling of solid particles therein, forcing the liquid to a heating zone by the pressure head of the gas, and intermittently withdrawing the liquid from the heating zone to receptacles while maintaining a constant volume of liquid between the heating zone and the receptacle to prevent cooking of the liquids.

RONALD B. McKINNIS